United States Patent [19]

Gall

[11] 3,917,633
[45] Nov. 4, 1975

[54] 9-[3-(DIMETHYLAMINO)-PROPYLIDENE]-9H-DIBENZO[C,F]-IMIDAZOL[1,2-A]AZEPINES

[75] Inventor: Martin Gall, Kalamazoo, Mich.

[73] Assignee: The Upjohn Company, Kalamazoo, Mich.

[22] Filed: Dec. 14, 1973

[21] Appl. No.: 424,666

[52] U.S. Cl. ............... 260/309; 424/248; 424/250; 424/267; 424/273; 260/240 TC; 260/239 BB; 260/247.5 R; 260/268 PC; 260/293.6; 260/326.81
[51] Int. Cl.² ..................................... C07D 223/16
[58] Field of Search .................................. 260/309

[56] References Cited
OTHER PUBLICATIONS
Hester, *J. Org. Chem.* Vol. 35, pp. 547 to 548, (1970).

Primary Examiner—John D. Randolph
Attorney, Agent, or Firm—Hans L. Berneis

[57] ABSTRACT

9H-Dibenzimidazo compounds of the formula:

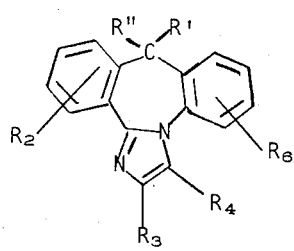

wherein R' and R" are integer or alkyl of one to three carbon atoms, inclusive, or R' is hydrogen or hydroxyl and R" is

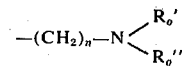

in which n is an innteger of 2 to 4, inclusive, $R_o'$ and $R_o''$ are hydrogen or alkyl, defined as above, or together

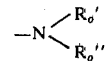

is pyrrolidino, piperidino, N-methylpiperazio or morpholino, or R' and R" together are =CH—$R_5$ in which $R_5$ is selected from the group consisting of hydrogen, alkyl as defined above,

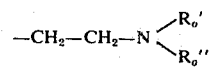

in which

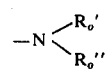

is defined as above; wherein $R_2$ and $R_6$ are hydrogen, halogen, or alkyl defined as above; and wherein $R_3$ and $R_4$ are selected from the group consisting of hydrogen, alkyl, as defined above, $CH_2OH$, or, with the proviso that if R' and R" are hydrogen, $R_3$ or $R_4$ can be

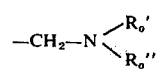

defined as above, are produced by multistep reactions.

The compounds of the formula above are sedatives, tranquilizers and anti-depressants, and therefore can be administered to mammals to alleviate anxieties and produce tranquilization and sedation.

4 Claims, No Drawings

9-[3-(DIMETHYLAMINO)-PROPYLIDENE]-9H-DIBENZO[C,F]-IMIDAZOL[1,2-A]AZEPINES

BACKGROUND OF THE INVENTION

Field of the Invention

This invention is directed to new organic compounds, and more particularly 9H-dibenzimidazo compounds, intermediates therefor and a process of production thereof.

The novel compounds, intermediates, and processes of production thereof can be illustratively represented by the following schemes:

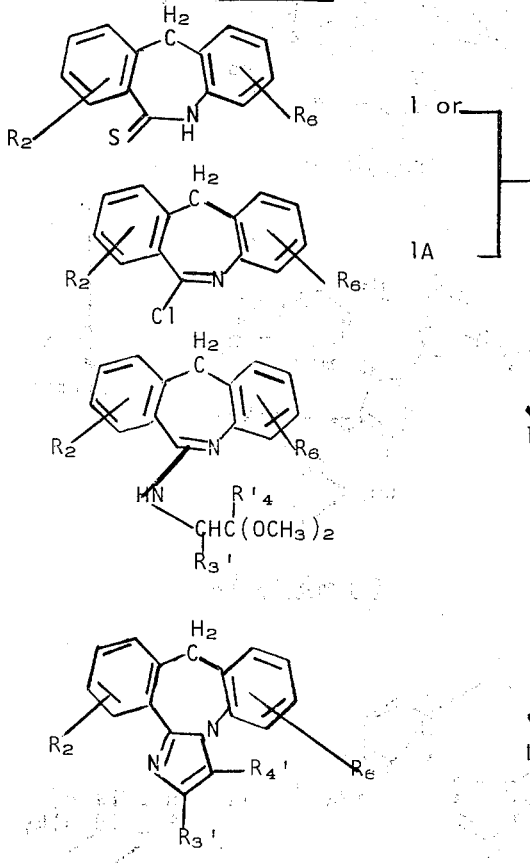

wherein $R_3'$ and $R_4'$ are hydrogen or alkyl of one to three carbon atoms, inclusive, and wherein $R_2$ and $R_6$ are selected from the group consisting of hydrogen, halogen, and alkyl defined as above.

Substitutions into III can be made by the following reactions (Schemes $B_1$ and $B_2$).

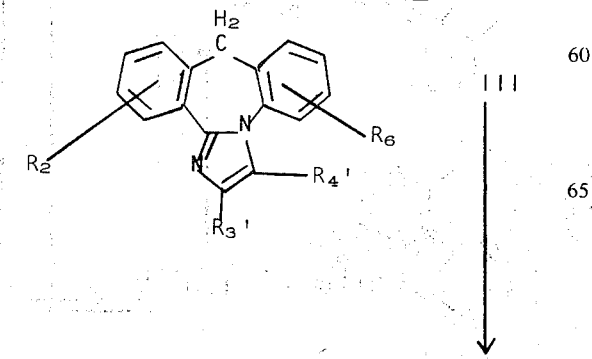

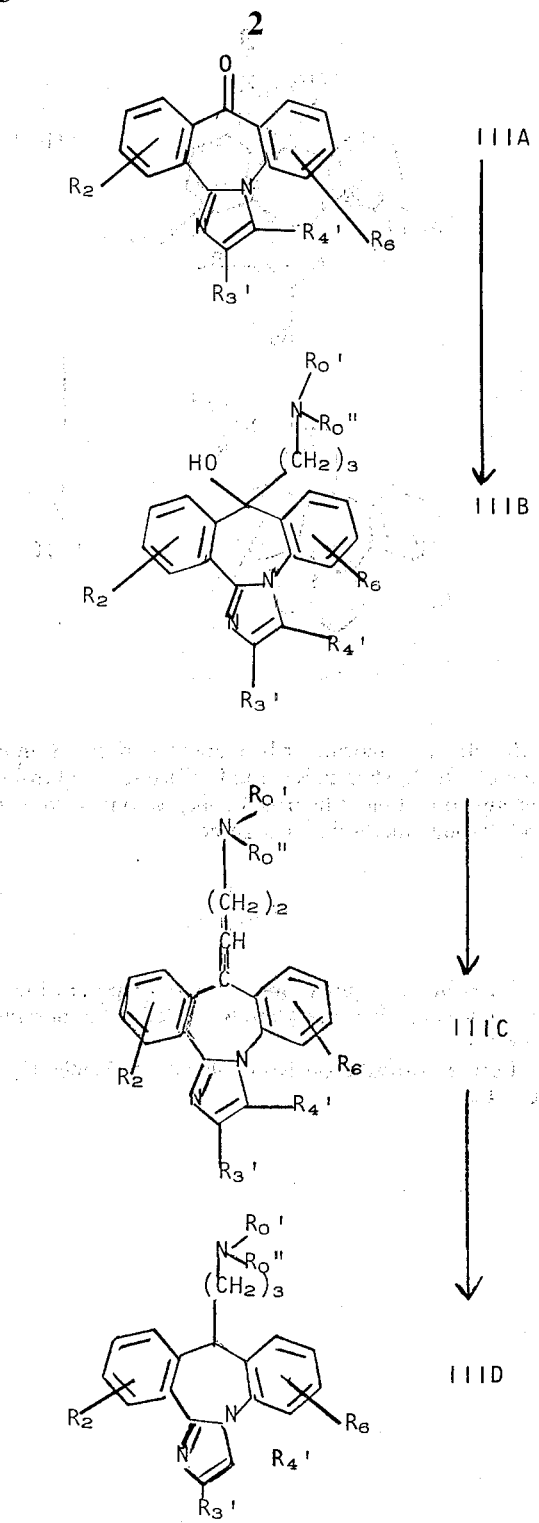

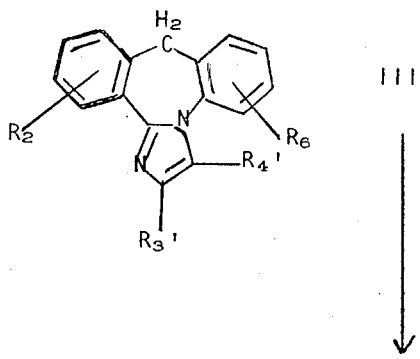

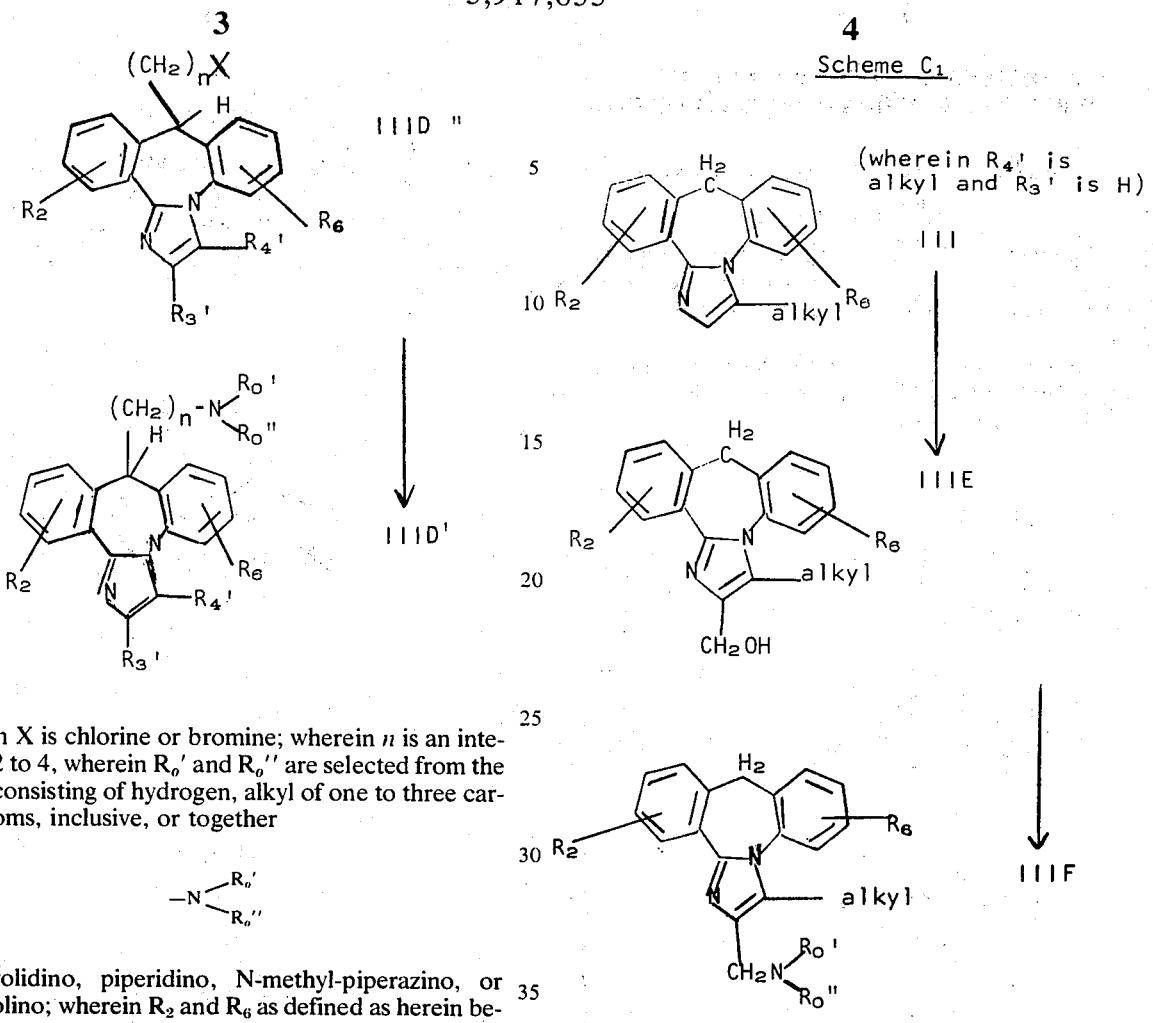

wherein X is chlorine or bromine; wherein $n$ is an integer of 2 to 4, wherein $R_o'$ and $R_o''$ are selected from the group consisting of hydrogen, alkyl of one to three carbon atoms, inclusive, or together $$-N\begin{matrix}R_o'\\R_o''\end{matrix}$$

is pyrrolidino, piperidino, N-methyl-piperazino, or morpholino; wherein $R_2$ and $R_6$ as defined as herein before.

Further substitution is possible by Schemes $C_1$ and $C_2$:

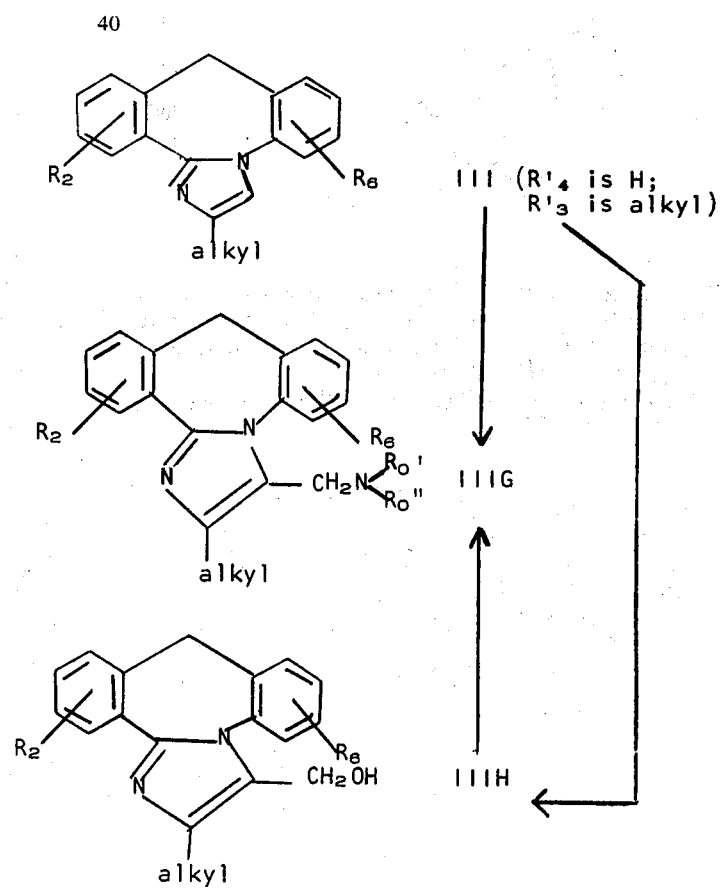

wherein $R_2$, $R_6$, $R_o'$ and $R_o''$ or

 5 are defined as above, and alkyl is of one to three carbon atoms, inclusive.

These schemes can also be used in combinations to obtain additional substituted compounds.

The basic processes of this invention are as follows:

Scheme A:

Treating a compound of formula I or IA with an aminoacetaldehyde acetal or amino ketal of the formulae

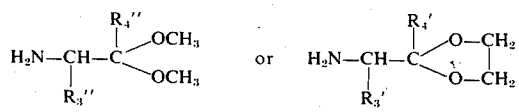

in which $R_3'$ and $R_4'$ are hydrogen or alkyl of one to three carbon atoms, to give compound II; and treating II with sulfuric acid to obtain a compound of the formula III;

Scheme $B_1$:

Treating a compound of formula III with Jones Reagent to obtain a ketone compound of formula IIIA, treating this ketone of formula IIIA with a Grignard reagent in tetrahydrofuran, to provide the conventional addition product IIIB possessing the alcohol group, treating IIIB with concentrated sulfuric acid to produce the unsaturated product IIIC and hydrogenating IIIC to obtain IIID.

Scheme $B_2$:

Treating a compound of formula III with lithium diisopropylamide or lithium 2,2,6,6-tetramethyl piperidine in an ethereal solvent and treating the resulting anion with (a) an ω-halo α-amino alkane to generate IIID'; or (b) treating the anion with an α,ω-dihaloalkane to generate IIID'' which is converted to IIID' by heating with a primary or secondary amine of formula $HNR_o'R_o''$ or with ammonia.

Scheme $C_1$:

Treating a compound of formula III in which $R_3'$ is alkyl and $R_4'$ is hydrogen with formalin and formic acid to obtain a compound of formula IIIE, which is treated at low temperatures with triethylamine and methanesulfonyl chloride followed by a suitable amine to form IIIF.

Scheme $C_2$:

Treating a compound of formula III wherein $R_3'$ is alkyl and $R_4'$ is hydrogen with formaldehyde and the acid salt of an amine to afford IIIG; or, alternatively, treating the same starting material with formaldehyde to afford IIIH which is treated with methanesulfonyl chloride and triethylamine followed by a suitable amine to form IIIG.

The compounds of special interest of this invention are, 9H-dibenzo[c,f]imidaze[1,2-a]azepines of the formula:

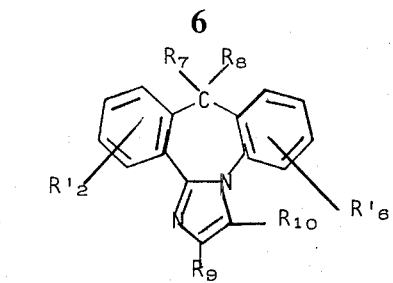

wherein $R_7$ and $R_8$ are selected from the group consisting of alkyl of one to three carbon atoms, inclusive, and

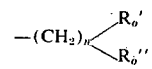

in which n is an integer of 2 to 4, and $R_o'$ and $R_o''$ are selected from the group consisting of hydrogen and alkyl defined as above, or together

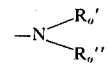

are pyrrolidino, piperidino, morpholino, and N-methylpiperazino; wherein $R_9$ and $R_{10}$ are selected from the group consisting of hydrogen, alkyl defined as above, and —$CH_2OH$ and wherein $R_2'$ and $R_6'$ are selected from the group consisting of hydrogen and chlorine.

The most desirable compounds have the formula:

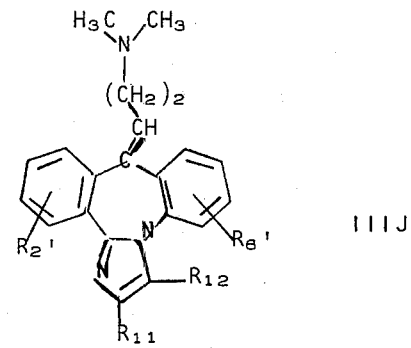

wherein $R_2'$ and $R_6'$ are selected from the group of hydrogen and chlorine; and wherein $R_{11}$ and $R_{12}$ are selected from the group consisting of hydrogen and alkyl of one to three carbon atoms, inclusive.

The compounds of formulae III, IIIB, IIIC, IIID, IIID',IIIE, IIIF, IIIG, IIIH, III(I), and IIIJ and the pharmacologically acceptable acid addition salts thereof, are sedatives, tranquilizers, and/or anti-depressants.

DESCRIPTION OF THE PREFERRED EMBODIMENT

Lower alkyl groups of one to three carbon atoms, inclusive, are exemplified by methyl, ethyl, propyl, and isopropyl.

The group $(CH_2)_n$ wherein n is 2 to 4 comprises —$(CH_2)_2$—, —$(CH_2)_3$—, —$(CH_2)_4$—, and branched alkylene such as

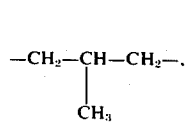 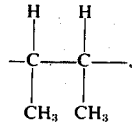 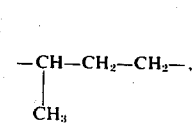 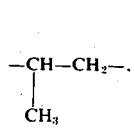

and the like.

Halogen is defined as flourine, chlorine, and bromine.

The novel compounds of this invention are useful agents for tranquilization and useful as antidepressants. They can be used in mammals and birds, particuarly for animals during travel by land, sea, or air like for zoo animals, e.g. lions, tigers, elephants, parrots, farm animals, e.g. cattle, sheep, swine or domestic animals e.g. cats and dogs.

The following compound, 9-[(3-dimethylamino)-propylidene]-9H-dibenzo[c,f]imidazo[1,2-a]azepine dihydrobromide having the formula

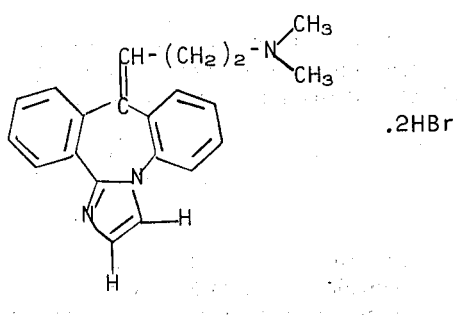

was tested for sedative and antidepressant activity and found to be active in laboratory animals. The tests were as follows:

Sedation-tranquilization:
  Chimney test: [Med. Exp. 4, 145 (1961)]: The test determines the ability of mice to back up and out of a vertical glass cylinder within 30 seconds. At the effective dosage, $ED_{50}$, 50% of the mice failed doing it.
  Dish test: Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50% of the mice remain in the dish.
  Pedestal test: The untreated mouse leaves a standard pedestal in less than a minute to climb back to the floor of the standard mouse box. Tranquilized mice will stay on the pedestal for more than 1 minute.
  Nicotine antagonism test: Mice in a group of 6 are injected with the test compound. Thirty minutes later the mice including control (untreated) mice are injected with nicotine salicylate (2 mg./kg.). The control mice show over-stimulation, i.e., (1) running convulsions followed by (2) tonic extensor fits; followed by (3) death.

The antidepressant action:
  The main function of an antidepressant is to return the depressed individual to normal function. This should be carefully differentiated from psychic stimulants such as the amphetamines which produce over-stimulation in the normal individual.

Many different methods have been and are used to evaluate antidepressant activity. In general these methods involve antagonism to a depressant such as reserpine or tetrabenazine or a synergistic increase of the toxicity of certain compounds (i.e., yohimbine or 3,4-dihydroxyphenylalanine) and comparison of the drug action of the new compound with other known antidepressants. No single test alone can determine whether or not a new compound is an antidepressant or not, but the profile evidenced by various tests will establish the anti-depressant action if present. A number of such tests are described below.

Hypothermic tests with oxotremorine: [1-[4-(pyrroliidinyl)-2-butynyl]-2-pyrrolidinone].

Oxotremorine (as well as apomorphine and tetrabenazine) produces hypothermic responses in mice. This response is blocked by anticholinergics and antidepressants such as atropine and imipramine.

Oxotremorine produces a very pronounced hypothermia which reaches a peak 60 minutes after administration.

At a dose of oxotremorine of 0.6 mg./kg. the body temperature of a mouse is decreased about 13° F. (when the mouse is kept at room temperature). This temperature decrease is antagonized by anti-depressants e.g. desipramine, imipramine, doxepine.

The present compounds were tested as follows. Four male mice of 18–22 g. (Strain CF = Carworth Farms) were injected intraperitoneally with 1 mg. of oxotremorine. The lowering of the body temperature was measured rectally with an electronic thermometer, before and 30 minutes after drug administration. After the drug administration the mice were kept at 19° C. in cages. A rise of 4° F. over the oxotremorine body temperature was taken as indicative of anti-depressant activity. The test compound had an $ED_{50}$ at a low dosage.

Potentiation of yohimbine aggregation toxicity: the $LD_{50}$ of yohimbine hydrochloride in mice is 45 mg./kg. i.p. Administration of 30 mg./kg. of yohimbine hydrochloride was non-lethal. If an antidepressant is administered prior to the yohimibine hydrochloride (30 mg.), the lethality of the yohimbine hydrochloride is increased.

Ten male CF mice, 18–22 g., were injected with yohimbine hydrochloride in saline solution. After 2 hours. The $LD_{50}$ are determined. Groups of 10 mice are injected with the antidepressant 30 minutes before the administration of yohimbine hydrochloride [YCl] (30 mg.). No mice, or only one mouse is killed, from 30 mg. of [YCl]. If [YCl] is administered in the presence of an anti-depressant, an increase in the toxicity of [YCl] is found.

Potentiation of apomorphine gnawing: a group of 4 mice (male, CF, 18–22 g.) are administered the test compound intraperitoneally one hour prior to the subcutaneous injection of apomorphine hydrochloride (10 mg./kg.). The mice are then placed in a plastic box (6 inches × 11 inches × 5 inches), lined at the bottom with a cellophane-backed, absorbent paper. The degree of damage to the paper at the end of 30 min. is scored from zero to 4. The scores 3 and 4 indicate that the compound is a potentiator of apomorphine in this test. The test compound gave a positive result.

The pharmaceutical forms of compounds of formula III, IIIB, IIIC, IIID, IIID', IIIE, IIIF, IIIG, IIIH, III(I), and IIIJ and salts thereof, contemplated by this invention, include pharmaceutical compositions suited for oral, parenteral, and rectal use, e.g., tablets, powder packets, cachets, dragees, capsules, solutions, suspensions, sterile injectable forms for intramuscular and subcutaneous injections, suppositories, bougies, and the like. Suitable diluents or carriers such as carbohydrates, lactose, proteins, lipids, calcium phosphate, cornstarch, talc, stearic acid, methylcellulose, and the like may be used as carriers or for coating purposes. Water or oils such as coconut oil, sesame oil, safflower oil, cottonseed oil, and peanut oil, may be used for preparing solutions or suspensions of the active drug. Sweetening, coloring, and flavoring agents may be added.

For mammals, food premixes with starch, oatmeal, dried fishmeat, fishmeal, flour, and the like can be prepared.

As sedatives and antidepressants the compounds of formulae III (including IIIA through IIIJ) and their pharmacologically acceptable acid addition salts can be used in dosages of 0.5–25 mg./kg.; preferably from 1 to 15 mg./kg. in oral or injectable preparations as described above to alleviate anxieties and depression occurring in stressful situations. For larger mammals over 5 kg. the lower dosage ranges are preferable.

Acid addition salts of the compounds of formula III IIIB, C, D, E, F, G, H, I, and J can be made, such as the fluosilicic acid addition salts which can be applied as mothproofing agents, and salts with trichloroacetic acid are useful as herbicides against Johnson grass, Bermuda grass, yellow and red foxtail, and quack grass.

The starting materials of this invention are dihydrodibenzoazepinethiones I which are either known or can be synthesized by treating the corresponding oxo compounds [U.S. Pat. No. 3,367,930; Schmutz et al., Helv. Chim. Acta 48 336, (1965)] with phosphorus pentasulfide as further illustrated by the Preparations. Instead of the thiones the 6-chloro-compounds can be used, prepared as shown under preparations.

In carrying out the process of this invention according to scheme A, a selected thione I, is heated for 1-40 hours with aminoacetaldehyde dimethyl acetal or other $\alpha$-aminoketals. The reaction is conveniently carried out in an inert organic solvent such as ethanol, 1-propanol, 2-propanol, 1- and 2-butanol, tetrahydrofuran, dioxane, diethylene glycol or the like. The resulting product II is obtained by conventional procedures, such as extraction, chromatography and crystallization.

Compound II is then cyclized, preferably in concentrated sulfuric acid, between 0° to 50° C. during ½ to 6 hours. The product III is produced by quenching the sulfuric acid reaction mixture cautiously in cold water and neutralizing the resulting precipitated slurry with sodium or potassium hydroxide or carbonate. From this mixture the product III is extracted with an organic solvent e.g. chloroform, methylene chloride, dioxane, tetrahydrofuran, or the like, and the pure product III is obtained by conventional procedures, such as extraction, chromatography, and crystallization.

In scheme $B_1$ a 9H-dibenzo[c,f]imidazo[1,2-a]azepin-9-one prepared from 9H-dibenzo[c,f]imidazo[1,2-a]azepine by oxidation with Jones Reagent) is submitted to an ordinary Grignard reagent prepared in situ by using a chloro or bromo compound of the structure RX' (defined as in Scheme B) and clean magnesium turnings in tetrahydrofuran. To facilitate the reaction iodine crystals are added to the Grignard reaction mixture, and at the end of the reaction ammonium chloride. Compound IIIB thus obtained, is isolated and purified by standard procedures, e.g. extraction, recrystallization.

To obtain product III(C) the product IIIB is dehydrated with concentrated sulfuric acid. The product III(C) is recovered by neutralizing the reaction mixture, extracting the product, purifying it by conventional means and crystallizing it, generally as a hydrobromide or fumarate acid salt.

To obtain product IIID, the product IIIC is hydrogenated over a catalyst, such as platinum on carbon in an alcohol solvent at room temperature.

Products IIID' in which the 9-alkylamino side chain may vary in length from two to four carbons may be obtained according to the steps shown in scheme $B_2$. Product III may be treated with lithium diisopropylamide at temperatures from 78° to −10° C. in a dry ethereal solvent (such as ether, 1,2-dimethoxyethane, diglyme, tetrahydrofuran and the like) to generate a lithium salt intermediate which is treated at −78° to 25° with a suitable dialkylaminoalkyl halide

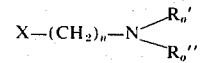

(defined previously) to obtain IIID' directly. Alternatively, the lithium salt may be treated at −78° to 40° C. with an $\alpha$, $\omega$-chloroalkyl halide $X-(CH_2)_nY$ (defined previously) to afford intermediate IIID'' which in turn may be treated with potassium iodide and a primary or secondary amine in dimethylformamide at temperatures from 25° to 100° C. to afford products IIID'.

In Scheme $C_1$, III (wherein $R_4'$ is alkyl and $R_3'$ is hydrogen) is treated either at atmospheric pressure or pressures up to 10 atmospheres with 37% aqueous formalin solution and heated to 80°–120° to afford the alcohol IIIE after the usual extraction and purifying procedures. IIIE is treated, in the cold (−50° to +10° C.) with triethylamine and methanesulfonyl chloride in solvents such as methylene chloride, tetrahydrofuran, hydrocarbon stabilized chloroform, or mixtures of these, to afford an intermediate mesylate derivative. This is immediately treated with an amine

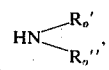

(wherein

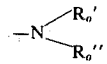

has been defined previously) to afford, after the usual extraction and purifying procedures and crystallization, as pharmacologically acceptable acid addition salt, the desired product IIIF.

In Scheme $C_2$, III (wherein $R_3'$ is alkyl and $R_4'$ is hydrogen) may be treated with formaldehyde and secondary amine hydrochloride mixtures in aqueous media containing cosolvents such as 1,2-dimethoxyethane or diglyme and heated to 70°–110° C. to afford, after the usual extraction and purifying procedure, desired compounds IIIG. Alternatively, the starting material may first be converted to the alcohol IIIH and thence to product IIIG by procedures exactly analogous to those described for Scheme $C_1$.

The above five schemes do not necessarily need to be applied singly to a starting compound. Whenever possible and desirable more than one of the schemes may be applied consecutively to introduce various other groups into one selected starting product I or IA.

The following preparations and examples are illustrative of the process and products of the present invention, but are not to be construed as limiting.

preparation of 1 — 6(5H)-morphanthridinethione

A mixture of 6(5H)-morphanthridinone (30 g., 0.144 mole), phosphorus pentasulfide (33.5 g., 0.158 mole) and 1200 ml. of pyridine was heated at reflux temperature for 23 hours and the pyridine was then evaporated. Methylene chloride and water were added, and the organic layer was separated (some solid was present), washed first with an aqueous sodium bicarbonate solution until only a trace of solid was present, then with a saturated salt solution, and finally dried over anhydrous magnesium sulfate and evaporated. Trituration of the residue with methanol gave 28.8 g. of 6(5H)-morphanthridinethione, of melting point 218°–219° C. Crystallization from methylene chloride-methanol gave the product in the form of pale yellow rods; the melting point was unchanged.

Anal. calcd. for $C_{14}H_{11}NS$: C, 74.63; H, 4.92; N, 6.22; S, 14.23. Found: C, 74.94; H, 5.07; N, 6.08; S, 14.25.

Preparation 2—2-Chloro-6(5H)-morphanthridinethione

A mixture of 2-chloro-6(5H)-morphanthridinone (10 g.; 0.046 mole), phosphorus pentasulfide (11.2 g.) and 340 ml. of pyridine was refluxed 3 hours and evaporated in vacuo. The residue was stirred for 2 hours with 500 ml. of methylene chloride and 250 ml. of saturated aqueous sodium bicarbonate, solution and filtered to give solid A. The organic layer of the filtrate was washed with an aqueous sodium bicarbonate solution, followed by a saturated salt solution, dried and evaporated. The residue was combined with product A and crystallized from chloroform-methanol. Two crops of 2-chloro-6(5H)-morphanthridinethione were obtained: a first crop of 5.6 g. in the form of yellow needles of melting point 246°–257.5° C., and a second of 4.0 g. of melting 245°–246° C.; yield, 93%

Anal. Calcd. for $C_{14}H_{10}ClNS$ : C, 64.73; H, 3.88; Cl, 13.65; N, 5.39; S, 12.35. Found: C, 64.66; H, 3.83; Cl, 13.89; N, 5.38; S, 12.05.

Other starting materials of formula I are produced as shown in the preceding Preparations. Such starting materials include:
8-chloro-6(5H)-morphanthridinethione;
2,8-dichloro-6(5H)-morphanthridinethione;
2-fluoro-6(5H)-morphanthridinethione;
8-methyl-6(5H)-morphanthridinethione;
10-methyl-6(5H)-morphanthridinethione;
9-bromo-4-isopropyl-6(5H)-morphanthridinethione;
8-chloro-6(5H)-morphanthridinethione;
7-fluoro-6(5H)-morphanthridinethione;
3-chloro-6(5H)-morphanthridinethione;
10-methyl-6(5H)-morphanthridinethione;
and the like.

Preparation 3—6-chloro-morphanthridine 5,6-Dihydro-6-morphanthridine (209.0 g. 1.0 mol.) was added to 290.0 g. (1.39 mol.) of phosphorus pentachloride in a 1.0 l. 3-neck flask. The mixture was heated in an oil bath at 130° for 2 hours. After removal of the initial forerun (75°–140° C. at 16 mm Hg) the product was distilled at 166°–170° and 0.15 mm Hg to afford 177.0 g. of a red oil which was redistilled (161°, 0.06 mm Hg) to afford 167.0 g. of light yellow oil. This oil was crystallized with some difficulty from ether/Skellysolve B hexanes to yield the moisture sensitive, amorphous 6-chloro-morphanthridine (melting point 66°–69°).

EXAMPLE 1

(6-Morphanthridinylamino)acetaldehyde dimethylacetal

A. 6(5H)morphanthridinethione [150 mmole] is heated with aminoacetaldehyde dimethyl acetal in 1-butanol for 5 hours to 130° to give (6-morphanthridinylamino)acetaldehyde dimethylacetal of melting point 120°–121° C.

B. A mixture of 6-chloromorphanthridine (60.0 g., 0.276 mol.), aminoacetaldehyde dimethyl acetal (90.0 g., 0.53 mol.) and 300 ml. of n-butanol is refluxed for 24 hours under nitrogen. The reaction solution is poured onto ice, neutralized with aqueous 5% sodium hydroxide solution and extracted with methylene chloride. The organic layer is washed twice with water and dried over anhydrous sodium sulfate. After drying, the methylene chloride is removed in vacuo to afford a yellow oil. Trituration with ethyl acetate yields 36 g. (44%) of 6-(morphanthridinylamino)acetaldehyde dimethylacetal in the form of prisms of melting point 120°–121° C. A second crop weighs 8.0 g. (9.8%) and has a melting point of 119°–121° C.

Anal. calcd. for $C_{18}H_{20}N_2O_2$: C, 72.70; H, 7.12; N, 9.42. Found: C, 72.52; H, 6.79; N, 9.33.

EXAMPLE 2

9H-Dibenz[c,f]imidazo[1,2-a]azepine (6-Morphanthridinylamino)acetaldehyde dimethylacetal (44 g., 147 mmol.) is dissolved in 60 ml. of concentrated sulfuric acid and the resulting solution is stirred at room temperature for 20 hours under a nitrogen atmosphere. The reaction solution is then poured onto ice, neutralized with a 10% aqueous sodium hydroxide solution, and extracted with chloroform. The chloroform extract is washed twice with water, dried over anhydrous sodium sulfate and concentrated in vacuo to give a brown solid. Crystallization from ethyl acetate yields 20.0 g. (58.6%) of 9H-dibenz[c,-f]imidazo[1,2-a]azepine of melting point 168°. A second crop weighing 5.0 g. (14.7%) of melting point 167-168° C. is also collected.

Anal. calcd. for $C_{18}H_{12}N_2$: C, 82.73; H, 5.21; N, 12.06. Found: C, 82.06; H, 5.20; N, 11.76.

EXAMPLE 3

9H-Dibenz[c,f]imidazo[1,2-a]azepine

In a 250 ml., 3-neck round-bottomed flask fitted with a reflux condenser, a mixture of 9.0 g. of 6-chloro-morphanthridine (40.0 mmol.) and 14.4 g. of aminoacetaldehyde dimethyl acetal (120.0 mmol.) in 60 ml. of diethylene glycol is heated at 190° C. for 18 hours in a nitrogen atmosphere. The resulting solution is cooled to room temperature and treated with 10 ml. of concentrated sulfuric acid. After 2 hours the reaction mixture is poured onto ice, basified with a 10% aqueous sodium hydroxide solution and extracted with chloroform. The combined chloroform extracts are dried with sodium sulfate and concentrated in vacuo to yield a brown oil. The oil is dissolved in hot ethyl acetate, treated with activated charcoal (trade name DARCO) and then filtered and crystallized at 0° C. to afford a yellow impure solid. The entire mixture (7 g. of orange yellow solid) is chromatographed over 1 kg. of silica gel by eluting with a 3% methanol-97% chloroform solution. The desired product is found in fractions 36–48 (150 ml. fractions) and crystallized to give 1.6 g. of 9H-dibenz[c,f]imidazo[1,2-a]azepine as light prisms of melting point 167-168° C.

Anal. calcd. for $C_{16}H_{12}N_2$: C, 82.73; H, 5.21) N, 12.06. Found: C, 81.91; H, 5.23; N, 11.61.

EXAMPLE 4

9H-dibenzo[c,f]imidazo[1,2-a]azepine

6(5H)morphanthridine-thione is reacted with aminoacetaldehyde dimethyl acetal in diethylene glycol solution. After 20 hours of heating to 190° C., the mixture is cooled to room temperatures and treated with concentrated sulfuric acid to give 9H-dibenz[c,f]imidazo[1,2-a]azepine of melting point 167°–168°, undepressed with an authentic sample.

EXAMPLE 5

2-Chloro-9H-dibenzo[c,f]imidazo[1,2-a]azepine

In the manner given in Example 4, 2-chloro-6(5H)-morphanthridinethione is reacted with aminoacetaldehyde dimethyl acetal in diethylene glycol solution. After 20 hours of heating to 190° C., the mixture is cooled to room temperatures treated with concentrated sulfuric acid to give 2-chloro-9H-dibenz[c,f]imidazo[1,2-a]azepine.

EXAMPLE 6

7-Methyl-9H-dibenzo[c,f]imidazo[1,2-a]azepine

In the manner given in Example 3, 2-methyl-6-chloromorphanthridine is reacted with aminoacetaldehyde dimethyl acetal in diethylene glycol solution. After 20 hours of heating to 190° C., the mixture is cooled to room temperatures treated with concentrated sulfuric acid to give 7-methyl-9H-dibenzo[c,f]imidazo[1,2-a]azepine.

EXAMPLE 7

10-methyl-9H-dibenzo[c,f]imidazo[1,2-a]azepine

In the manner given in Example 3, 6-chloro-10-methyl morphanthridine is reacted with aminoacetaldehyde dimethyl acetal in diethylene glycol solution. After 20 hours of heating to 190° C., the mixture is cooled to room temperatures treated with concentrated sulfuric acid to give 10-methyl-9H-dibenz[c,f]imidazo[1,2-a]azepine.

EXAMPLE 8

6-chloro-9H-dibenzo[c,f]imidazo[1,2-a]azepine

In the manner given in Example 3, 3,6-dichloro-morphanthridine is reacted with aminoacetaldehyde dimethyl acetal in diethylene glycol solution. After 20 hours of heating to 190° C., the mixture is cooled to room temperatures, treated with concentrated sulfuric acid to give 6-chloro-9H-dibenz[c,f]imidazo[1,2-a]azepine.

EXAMPLE 9

9H-Dibenzo[c,f]imidazo[1,2-a]azepin-9-one

In a 500 ml. 3-neck round bottomed flask fitted with a condenser is dissolved 15.0 g. (64.6 mmol.) of 9H-dibenzo[c,f]imidazo[1,2-a]azepine in 60 ml. of glacial acetic acid. To this is added 60 ml. of a freshly prepared solution of Jones reagent. A solid precipitates immediately, but on warming on a steam bath in a nitrogen atmosphere, it rapidly dissolves. Within 1 hour the orange solution has turned green. Heating is continued for a total of 3 hours. The reaction mixture is quenched in a 10% aqueous sodium hydroxide solution and extracted with chloroform. The chloroform layer is washed with water and dried over anhydrous potassium carbonate and concentrated in vacuo to yield a yellow-white residue which crystallizes from methanol/methylene chloride to give 8.7 g. (54.5%) of 9H-dibenzo[c,f]imidazo[1,2-a]azepin-9-one of melting point 215-216°. A second crop weighs 2.3 g. (14.4%). An analytical sample has a melting point of 218°–220°.

Anal. calcd. for $C_{16}H_{10}N_2O$: C, 78.03; H, 4.09; N, 11.38. Found: C, 77.94; H, 4.17; N, 11.13.

EXAMPLE 10

9-[3-(dimethylamino)propyl]-9H-dibenz[c,f]-imidazo[1,2-a]azepin-9-ol

A 250 ml., three-neck round-bottomed flask fitted with a condenser and dropping funnel is flame-dried and flushed with nitrogen. To it is added 1 g. of magnesium metal (0.0416 g. atom) and 40 ml. of freshly distilled tetrahydrofuran. A few crystals of iodine are added and the mixture is heated gently on a steam bath. After the iodine color has faded, a solution of 4.0 g. (32.0 mmol.) of dimethylamino propyl chloride in 4.0 g. of benzene is added dropwise and the resulting mixture is continuously heated on the steam bath. Immediately the reaction solution turns completely colorless and a small amount of a white suspension forms. After complete addition, the mixture turns gray and is heated gently for 1 hour. To this Grignard reagent, stirred at room temperature, is added a solution of 3.075 g. (12.5 mmol.) of 9H-dibenzo[c,f][1,2-a]azepin-9-one, dissolved in 60 ml. of hot tetrahydrofuran. After the addition is completed the resulting suspension is refluxed for 1 hour and then cooled to room temperature. A solution of 2.4 g. fo ammonium chloride in 20 ml. of water is added and the mixture is stirred at room temperature overnight. It is then extracted with chloroform, dried over sodium sulfate and concentrated in vacuo to give 4.0 g. of white solid. This is crystallized from cyclohexane to give 4.0 g. (96%) of 9-[3-(dimethylamino)propyl]-9H-dibenz[c,f]imidazo[1,2-a]azepin-9-ol in two crops of melting point 152°–153° C.

Anal. calcd. for $C_{21}H_{23}N_3O$: C, 75.64; H, 6.95; N, 12.61. Found: C, 75.26; H, 6.47; N, 12.34.

EXAMPLE 11

9-[3-(dimethylamino)propylidene]-9H-dibenzo[c,f]imidazo[1,2-a]azepine and its fumarate A solution of 850 mg. (2.42 mmol.) of 9-[3-(dimethylamino)propyl]-9H-dibenz[c,f][1,2]-a]azepin-9-ol in 15 ml. of concentrated sulfuric acid is stirred at room temperature for 20 hours, poured onto ice, and neutralized with a 10% aqueous sodium hydroxide solution. The product is extracted with chlorform, washed with water, dried (sodium sulfate) and concentrated in vacuo to yield 800 mg. of an oil. This is combined with 300 mg. of an oil prepared in an identical fashion, dissolved in ethanol and treated with a solution of 1 g. of fumaric acid in ethanol. Crystallization yields 9-[3-(dimethylamino)propylidene]-9H-dibenz[c,f]imidazo[1,2-a]azepine as a 1½ fumarate salt of melting point 181-183° C.

Anal. calcd. for $C_{21}H_{21}N_3 \cdot 1\frac{1}{2}(C_4H_4O_4)$ mw 489.52: C, 66.24; H, 5.56; N, 8.59. Found: C, 66.22; H, 5.45; N, 8.55.

EXAMPLE 12

3-Methyl-9H-dibenz[c,f]imidazo[1,2-a]azepine

Morphanthridyl chloride (2.175 g., 10.0 mmol.), dissolved in 20 ml. of diethylene glycol, is treated with 1.65 g. (30.0 mmol.) of propargyl amine and heated to 100° C. The temperatures is slowly raised to 140° C. (by 120°, the solution starts to turn orange-brown) and heating is continued for 18 hours. At the end of this heating period, the reaction is poured onto crushed ice, made basic with a 5% aqueous sodium hydroxide solution, extracted with chloroform, dried over anhydrous sodium sulfate and concentrated in vacuo. The product is chromatographed over 250 g. of silica gel by eluting with a 3% methanol-97% chloroform solution and collected in fractions 29–52 (10 ml. fractions were collected). The product is crystallized as a fumarate salt, to give 1.1 g. of 3-methyl-9H-dibenz[c,f]imidazo[1,2-a]azepine fumarate of melting point 203-205° C.

EXAMPLE 13

3-Methyl-9H-dibenz[c,f]imidazo[1,2-a]azepine and its fumarate

In a three-neck 1,000 ml. round-bottomed flask fitted with a condenser and a thermometer, 45 g. (0.20 mol.) of morphanthridyl chloride and 60.6 g. (0.60 mol.) of aminoacetone ethylene ketal in 2,000 ml. of diethylene glycol is heated first at 140° C. for 4 hours and then overnight at 160° C. in a nitrogen atmosphere. The resulting solution is cooled to room temperature, poured onto crushed ice and basified with 10% aqueous sodium hydroxide solution. The product is extracted with chloroform, dried over anhydrous sodium sulfate and isolated to give 52 g. of a dark brown oil by removing the chloroform in vacuo. This oil is combined with the oil produced from a similar sequence on one-tenth the scale and chromatographed over silica gel by eluting with a 3% methanol-97% chloroform solution. The product is dissolved in ethanol, treated with activated charcoal, filtered, and finally added to a hot solution of 17.4 g. (0.15 mol.) of fumaric acid dissolved in 200 ml. of ethanol. The solution is cooled to afford 28.5 g. of 3-methyl-9H-dibenz[c,f]imidazo[1,2-a]azepine as the ½ fumarate salt. A second crop weighed 6.8 g. The analytical sample had a melting point of 208°-209° C.

Anal. calcd. for $C_{17}H_{14}N_2 \cdot \frac{1}{2}C_4H_4O_4$: C, 74.98; H, 5.30; N, 9.21. Found: C, 74.76; H, 5.30; N, 9.11.

EXAMPLE 14

2-Methyl-9H-dibenzo[c,f]imidazo[1,2-a]azepine

In a three-neck, 1000-ml. flask fitted with a condenser and thermometer is heated a mixture of 45 g. (2,000 mmol.) of chloromorphanthridine, 72.0 g. (600 mmol.) of aminopropionaldehyde, dimethyl acetal and 400 ml. of diethylene glycol at 150° C., with stirring and in a nitrogen atmosphere, for 20 hours. During the course of the reaction, the solution turns dark brown in color. At the end of the reaction time, the solution is cooled to room temperature, poured onto ice and made basic with a 10% aqueous sodium hydroxide solution. The product is extracted with chloroform; the chloroform extract is washed with water, dried over anhydrous potassium carbonate and concentrated in vacuo to give a brown oil. The product is crystallized from ethyl acetate as 24 g. (46.5%) of a 2-methyl-9H-dibenzo[c,f]imidazo[1,2-a]azepine of melting point 168°-170° C. The filtrate is treated with activated charcoal, filtered hot and concentrated to yield, on cooling, an additional 7.0 g. (17.5%) of product. An analytical sample has a melting point of 171°-172° C.

Anal. calcd. for $C_{17}H_{14}N_2$: C, 82.90; H, 5.73; N, 11.37. Found: C, 82.70; H, 5.80; N, 11.27.

EXAMPLE 15

2-Methyl-3-(hydroxymethyl)-9H-dibenzo[c,f]imidazo[1,2-a]azepine

2-Methyl-9H-dibenzo[c,f]imidazo[1,2-a]azepine (2.46 g., 10.0 mmol.) is treated with 3.0 ml of an 88% aqueous formalin solution and heated for 20 hours (overnight). At the end of this time the entire reaction mixture is quenched in a cold, aqueous 5% sodium hydroxide solution and extracted with chloroform. The chloroform layer is dried over anhydrous sodium sulfate and concentrated in vacuo to give an oil. The oil is chromatographed over 250 g. of silica gel using first 1 liter of a 1% methanol-99% chloroform solution. In this way the product is separated from a small amount of starting material and an unidentified component to give 1.8 g. of colorless oil, collected in fractions 118–145 (10 ml. fractions were collected). The product is crystallized from ethyl acetate to give 1.77 g. of 2-methyl-3-(hydroxymethyl)-9H-dibenzo[c,f]imidazo[1,2-a]azepine of an ethyl acetate solvate of the product of melting point 120-123° C. (foaming). The sample then solidifies and remelts at 209-210° C.

Anal. calcd. for $C_{18}H_{16}N_2O \cdot 1/6 C_4H_8O_2$ mol wt. 291.01: C, 77.14; H, 5.99; N, 9.66. Found: C, 77.01; H, 5.92; N, 9.67.

EXAMPLE 16

2-(Hydroxymethyl)-3-methyl-9H-dibenz[c,f]imidazo[1,2-a]azepine

In a 250 ml., round-bottomed flask fitted with a reflux condenser 16 g. (52.0 mmol.) of 3-methyl-9H-dibenz[c,f]imidazo[1,2-a]azepine (Example 12) is dissolved in 132 ml. of a 37% formalin solution by adding 5.25 ml. of an 88% aqueous formic acid solution. The solution is heated for 24 hours, quenched in a 5% aqueous sodium hydroxide solution, and extracted with chloroform. The chloroform extracts are washed with water, dried over anhydrous sodium sulfate and concentrated in vacuo to afford a white oil, which is chromatographed over 1kg. of silica gel by eluting with a 3% methanol-97chloroform solution. After a 2 l. forerun, unreacted starting material is collected as an oil in fractions 2 to 8 (200 ml. fractions are collected). Fractions 9–17 yield 6 g. of the product isolated as an oil, which upon recrystallization affords 4.3 g. of white needles of the desired 2-(hydroxymethyl)-3-methyl-9H-dibenz[c,f]imidazo[1,2-a]azepine in two crops of melting point 203°-206° C.

Anal. calcd. for $C_{18}H_{16}N_2O$: C, 78.23; H, 5.84; N, 10.14. Found: C, 77.55; H, 5.92; N, 9.91.

EXAMPLE 17

2-Methyl-3-(1-pyrrolidinylmethyl)-9H-dibenzo[c,f]imidazo[1,2-a]azepine dihydrobromide A mixture of 2.4 ml. of a 37% aqueous formalin solution (0.888 g., 29.6 mmol.), 1.0 mol. (0.852 g., 12.0 mmol.) of pyrrolidine, 6.0 ml. of a 2 N hydrochloric acid solution and 8.0 ml. of monoglyme is placed in a 50 ml. round bottom flask. 2-Methyl-9H-dibenzo[c,f]imidazo[1,2-a]azepine (0.985 g., 4.00 mmol.) is added and the mixture is heated at 100° C. for 22 hours. The reaction solution is cooled to room temperature, poured into a cold 5% aqueous sodium hydroxide solution and extracted with chloroform. The chloroform extract is dried over anhydrous sodium sulfate and concentrated in vacuo to give a light green oil. This oil is chromatographed over 100 g. of silica gel using a 3% methanol–97% chloroform solution as eluent. The product is collected in fractions 48–72 (10 ml. fractions were collected) and crystallized from methanol-ethyl acetate as its dihydrobromide salt to yield 250 mg. (12.7%) of 2-methyl-3-(1-pyrrolidinylmethyl)-9H-dibenzo[c,f]imidazo[1,2-a]azepine dihydrobromide of melting point 256°–259° C. (decomposed).

Anal. calcd. for $C_{22}H_{23}N_3.2HBr$: C, 53.80; H, 5.13; N, 8.55; Br, 32.51. Found: C, 53.82; H, 5.28; N, 8.59; Br, 32.01.

EXAMPLE 18

3-methyl-2-(1-pyrrolidinylmethyl)-9H-dibenzo[c,f]imidazo[1,2-a]azepine

2-Hydroxymethyl-3-methyl-9H-dibenz[c,f]imidazo[1,2-a]-azepine (Example 16) (2.76 g., 10.0 mmol., dissolved in 50 ml. of chloroform), is cooled to −20° C. and treated with 4.12 ml. (30.0 mmol.) of distilled triethylamine. Since this alcohol precipitates from the solution at −20° C., 20 ml. of freshly distilled tetrahydrofuran is added to partially redissolve the starting material. To this mixture 1.72 ml. (20.0 mmol.) of methanesulfonyl chloride is added, dropwise, via syringe, over a period of 7 minutes. After the addition is nearly completed, a clear solution results and this solution is stirred at −20° C. for ¼ hour. To the solution is added 10 ml. of pyrrolidine (distilled from calcium hydride). The solution is kept at −20° C. for 1 hour and then gradually warmed to room temperature. The reaction mixture is not worked-up immediately but is allowed to stir overnight. The solution is quenched in water, made basic with a 5% aqueous sodium hydroxide solution, and extracted with chloroform. The chloroform extracts are combined, dried over anhydrous sodium sulfate, and concentrated in vacuo to give an oil. Trituration in ethanol gives 500 mg. of a white solid of melting point 166°–170°C. The mother liquor is saved.

The desired product is obtained from the ethanol mother liquors and crystallized from methanol ethyl acetate as a hydrobromide salt methanol solvate of melting point 108°–110° (foaming) (A). The mother liquors yields a different crop of melting point 158°–160° (B) whose nmr is similar to A except no methanol is present. Compound A is assigned the formula:

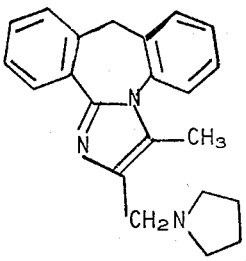

.2HBr . $CH_3OH-H_2O$

Anal. calcd. for $C_{22}H_{23}N_3.2HBr.CH_3OH.H_2O$: C, 51.03; H, 5.77; N, 7.76; Br, 29.52. Found: C, 50.35; H, 5.52; N, 7.84; Br, 29.58.

EXAMPLE 19

9-[3-(4-Methyl-1-piperazinyl)propyl]-9H-dibenz[c,f]imidazo[1,2-a]azepin-9-ol

In a manner similar to example 10, 1-chloropropyl-4-methylpiperazine [5.6 g. (32.0 mmol.) in 5.6 g. of xylene] is converted to its corresponding Grignard reagent in 40 ml. of tetrahydrofuran. It is necessary to heat the chloride in the presence of excess magnesium metal (0.0416 g./atom) for 2 ½ hours to insure complete formation of the Grignard. To the Grignard, cooled to room temperature, is added 12.5 mmol. of 9H-dibenzo[c,f][1,2-a]azepin-9-one, dissolved in 70 ml. of hot tetrahydrofuran. Workup as before and crystallization from methanol/ethyl acetate mixtures afford 3.35 g. (69%) of 9-[3-(4-methyl-1-piperazinyl)propyl]-9H-dibenz[c,f]imidazo[1,2-a]azepin-9-ol of melting point 203°–207° C.

Anal. calcd. for $C_{24}H_{28}N_4O$. MW 388.50: C, 74.19; H, 7.26; N, 14.42. Found: C, 74.06; H, 7.20; N, 14.44.

EXAMPLE 20

2-Methyl-9(-3-chloropropyl)-9H-dibenz[c,f]imidazo[1,2-a]azepine

2-Methyl-9H-dibenzo[c,f]imidazo[1,2-a]azepine (9.372 g., 38.0 mmol.) dissolved in 40 ml. of hot tetrahydrofuran, is added to a solution of lithium diisopropylamide (prepared by adding 6.08 g. 60.0 mmol, of diisopropylamine to 48.0 mmol. of methyl lithium in 20 ml. of 1,2-dimethoxyethane at −60°) at an initial temperature of −60° C. The resulting green-black anion is treated with 12.593 g. (80.0 mmol.) of 1-chloro-3-bromopropane at −50° C. The solution is stirred until the bath temperature reaches 15° C. The reaction mixture is worked up by quenching in a cold aqueous 5% sodium hydroxide solution and extracted with chloroform. The chloroform extracts are dried over sodium sulfate and concentrated to an oil. The oil is chromatographed over 1,300 g. of silica gel by eluting with 2 l. of a 50/50 v/v ethyl acetate/Skellysolve B hexanes. After discarding a 1.5 l. forerun, 200 ml. fractions are collected. Fractions 13–22 are combined and concentrated to give 11 g. of oil. This oil cannot be crystallized directly. However, trituration in ethyl ether causes the precipitation of a small amount of white solid. This solid becomes an oil on standing in air. The mother liquors slowly deposited 2-methyl-9-(3-chloropropyl)-9H-dibenz[c,f]imidazo[1,2-a]-azepin of melting point 125°–129° C.

EXAMPLE 21

2-Methyl-[3-(4-methyl-1-piperazinyl)propyl]-9H-dibenz[c,f]imidazo[1,2-a]azepine

As in example 20, the anion of 2-methyl-9H-dibenz[c,f]imidazo[1,2-a]azepine is generated by treating 24.0 mmol of lithium diisopropylamide in 10 ml. of 1,2-dimethoxyethane at −50° with 4.68 g (19.0 mmol) of the imidazole, dissolved in 20 ml. of hot tetrahydrofuran. The solution is kept at −50° C. for 15 min. and then treated with 13.0 g (73.4 mmol) of 4-methylpiperazinylpropyl chloride dissolved in 13.0 g. of xylene. After stirring for 2 hours, during which time the bath temperature reached +10° C, the reaction mixture is worked up by quenching the solution in a cold aqueous 5% sodium hydroxide solution and extracting with chloroform. The dried (sodium sulfate) chloroform extracts are combined and concentrated to an oil which is crystallized as an amorphous fumarate derivative by crystallization from 150 ml of ethanol containing 5.0 g. of fumaric acid. The powder (8 g., mp. 172° –182°) is recrystallized from 100 ml of ethanol to afford 3.5 g of 2-methyl-[3-(4-methyl-1-piperazinyl)propyl]-9H-dibenz[c,f]imidazo[1,2-a]azepine of melting point 189°–200° C. A second crop weighed 1.2 g and had a melting point 175°–185°.

EXAMPLE 22

2-Methyl-9-[3-(4-methyl-1-piperazinyl)propyl]-9H-dibenz[c,f]imidazo-[1,2-a]azepine An alternative procedure (see example 21) requires heating 1.614 g (5.0 mmol) of 2-methyl-9-(3-chloropropyl)-9H-dibenz[c,f]imidazo[1,2-a]azepine to 50° to 50 ml of dimethylformamide with 10 ml. of 4-methylpiperazine and 1.66 g. (10.0 mmol) of potassium iodide. After 24 hours, the reaction is worked up by quenching in a cold 5% aqueous sodium hydroxide solution, extracting with chloroform, drying (sodium sulfate) and concentrating to the oily 2-methyl-9-[3-(4-methylpiperazinyl)propyl]-9H-dibenz[c,f]imidazo[1,2-a]-azepine.

EXAMPLE 23

2-Methyl-9-(3-pyrrolidinyl-propyl)-9H-dibenz[c,f]imidazo[1,2-a]azepine

In the manner described in Example 22, 2-methyl-9-(3-chloropropyl)-9H-dibenz-[c,f]imidazo[k,2-a]azepine is heated in dimethylformamide with pyrrolidine and potassium iodide to afford 2-methyl-9-(3-pyrrolidinyl-propyl)-9H-dibenz[c,f]imidazo-[1,2-a]azepine.

EXAMPLE 24

2-Methyl-9-[3-dimethylamino)propyl]-9H-dibenz[c,f]imidazo[1,2-a]azepine.

In the manner described in Example 22, 2-methyl-9-(3-chloropropyl)-9H-dibenz-[c,f]-imidazo[1,2-a]azepine is heated in dimethylformamide with dimethylamine and potassium iodide to give 2-methyl-9-[3-(dimethyl amino) propyl]-9H-dibenz[c,f]imidazo[1,2-a]azepine.

EXAMPLE 25

9-[2-(dimethylamino)ethyl]-9H-dibenz[c,f]imidazo[1,2-a]azepine.

In the manner of Example 21, 9H-dibenz[c,f]imidazo[1,2-a]azepine is treated with lithium diisopropylamide in 1,2-dimethoxyethane/tetrahydrofuran mixtures to form a carbanion which is treated with 2-(dimethylamino)ethyl chloride in an equal weight of benzene to give 9-[2-(dimethylamino)ethyl]-9H-dibenz[c,f]-imidazo[1,2-a]azepine.

EXAMPLE 26

9-(2-chloroethyl)-9H-dibenz[c,f]imidazo[1,2-a]azepine

In the manner of Example 20, 9H-dibenz[c,f]imidazo[1,2-a[azepine is treated with lithium diisopropyl amide in 1,2-dimethoxyethane/tetrahydrofuran mixtures to generate an anion which, in turn, is treated with 2-chloroethyl bromide to give 9-(2-chloroethyl)-9H-dibenz[c,f]imidazo[1,2-a]azepine.

EXAMPLE 27

9-[3-(dimethylamino)propyl]-9H-dibenz[c,f]imidazo[1,2-a]azepine

Crude 9-[3(dimethylamino)propylidene]-9H-dibenz[c,f]imidazo[1,2-a]azepine is dissolved in ethanol and hydrogenated over platinum on carbon at 30 psi pressure to give 9-[3-(dimethylamino)propyl]-9H-dibenz[c,f]imidazo[1,2-a]azepine as a light yellow oil.

EXAMPLE 28

9-[3-(4-methyl-1-piperizinyl)propylidene]-9H-dibenz[c,f]imidazo[1,2-a]azepine.

In the manner given in Example 11, 9-[3-(4-methyl-1-piperazinyl)propyl]-9H-dibenz[c,f]imidazo[1,2-a]azepine-9-ol is dissolved in concentrated sulfuric acid and stirred at room temperature for 20 hours, poured onto ice, neutralized with aqueous base, extracted with chloroform, dried and concentrated to give 9-[3-(4-methyl-1-piperazinyl)propylidene]-9H-dibenz[c,f]imidazo[1,2-a]azepine.

In the manner given in the preceding examples, other compounds corresponding to formula III, IIIB, IIIC, IIID, IIID',IIIE, IIIF, IIIG, IIIH and III(I) can be prepared. Representative compounds, thus obtained, include:

2-methyl-5-fluoro-9H-dibenz[c,f]imidazo[1,2-a]azepine;
3-hydroxymethyl-7-chloro-9H-dibenz[c,f]imidazo[1,2-a]azepine;
2-methyl-3-hydroxymethyl-7,12-diisopropyl-9H-dibenz[c,f]-imidazo[1,2-a]azepine;
3-methyl-12-chloro-9H-dibenz[c,f]imidazo[1,2-a]-azepine;
6-chloro-3-(hydroxymethyl)-9H-dibenz[c,f]imidazo[1,2-a]-azepine;
2,9-dimethyl-9H-dibebnz[c,f]imidazo[1,2-a]azepine;
2,6,11 triethyl-9H-dibenz[c,f]imidazo[1,2-a]azepine;
12-bromo-2-ethyl-3-hydroxymethyl-9H-dibenz[c,f]-imidazo[1,2-a]azepine;
6-bromo-2-methyl-9H-dibenz[c,f]imidazo[1,2-a]azepine; 3-methyl-2-(morpholinomethyl)-9H-dibenz[c,f]imidazo[1,2-a]-azepine;
6-chloro-9-[3-(dimethylamino)propyl]-9H-dibenzo[c,f]-imidazo[1,2-a]azepin-9-ol; 6-chloro-9-[3-(dimethylamino)propylidene]-9H-dibenzo[c,f]imidazo[1,2-a]azepine; 7-chloro-9-[3-(4-methyl-piperazinyl)propyl]-9H-dibenz [c,f]imidazo[1,2-a]azepin-9-ol; 7-chloro-9-[3-(4-methyl-piperazinyl)propylidene]-9H-dibenzo-[c,f]imidazo[1,2-a]azepine, and the like.

Treatment of the compounds of the formulae III which includes III, IIIB, IIIC, IIID, IIID',IIIE, IIIF,IIIG- ,IIIH, III(I) and IIIJ, with pharmacologically acceptable acids preferably in a solvent e.g. water, ethanol, ether, dioxane and the like, provides the pharmacologically acceptable acid addition salts of these 9H-dibenzoimidazo compounds. Examples of such addition salts are the hydrochlorides, hydrobromides, hydriodides, sulfates, fumarates, methanesulfonates, toluenesulfonates, citrates, tartrates, lactates, palmoates, lauroates, acetates, succinates and the like.

I claim:
1. A compound according to claim 1 of the formula:

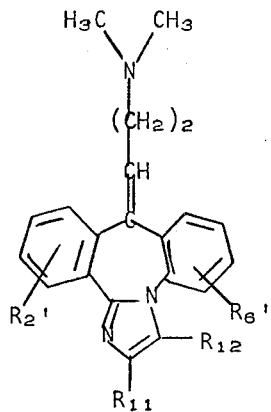

wherein $R_2'$ and $R_6'$ are selected from the group of hydrogen and chlorine, and wherein $R_{11}$ and $R_{12}$ are selected from the group consisting of hydrogen and alkyl of one to three carbon atoms, inclusive.

2. The compound according to claim 1 as a fumarate salt wherein $R_2'$, $R_{11}$, $R_{12}$, and $R_6'$ are hydrogen, and the compound is therefore 9-[3-(dimethylamino)-propylidene]-9H-dibenzo[c,f]-imidazo[1,2-a]azepine fumarate.

3. A compound according to claim 1, wherien $R'_2$, $R'_6$, $R_{11}$, and $R_{12}$ are hydrogen, and the compound is therefore 9-[3-(dimethylamino)propylidene]-9H-dibenzo[c,f]imidazo[1,2-a]azepine.

4. A compound according to claim 1, wherein $R'_2$ is 6-chloro, $R'_6$, $R_{11}$ and $R_{12}$ are hydrogen and the compound is therefore 6-chloro-9-[3-(dimethylamino)-propylidene]-9H-dibenzo[c,f]imidazo[1,2-a]azepine.

* * * * *